United States Patent
Nadkarni et al.

(10) Patent No.: US 12,167,277 B2
(45) Date of Patent: Dec. 10, 2024

(54) ENFORCING DIFFERENTIAL POLICIES ON USER TRAFFIC IN A 5G/EPC ENVIRONMENT WITH CONGESTION AVOIDANCE AND REAL TIME POLICY ENFORCEMENT

(71) Applicant: Cisco Technology, Inc., San Jose, CA (US)

(72) Inventors: Milind Suresh Nadkarni, Pune (IN); Umesh Prabhakar Gaikwad, Maharashtra (IN); Sanjeev Panem Jaya, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 17/488,365

(22) Filed: Sep. 29, 2021

(65) Prior Publication Data

US 2023/0102724 A1   Mar. 30, 2023

(51) Int. Cl.
*H04W 28/06* (2009.01)
*H04W 28/10* (2009.01)

(52) U.S. Cl.
CPC ............ *H04W 28/06* (2013.01); *H04W 28/10* (2013.01)

(58) Field of Classification Search
CPC .. H04W 28/06; H04W 28/10; H04W 28/0263
See application file for complete search history.

(56) References Cited

U.S. PATENT DOCUMENTS

| | | | |
|---|---|---|---|
| 10,448,268 B1* | 10/2019 | Jaya | H04W 76/19 |
| 2017/0180565 A1* | 6/2017 | Chowdhury | H04L 12/1407 |
| 2020/0022020 A1 | 1/2020 | Yan et al. | |
| 2020/0221366 A1* | 7/2020 | Palmer | H04N 21/43615 |
| 2020/0245381 A1 | 7/2020 | Talebi Fard et al. | |
| 2021/0067907 A1* | 3/2021 | Sze | H04N 21/41407 |
| 2021/0360506 A1* | 11/2021 | Yang | H04W 40/02 |

FOREIGN PATENT DOCUMENTS

| | | |
|---|---|---|
| WO | 2019136704 A1 | 7/2019 |
| WO | 2019210947 A | 11/2019 |
| WO | 2020126108 A1 | 6/2020 |
| WO | WO-2021254643 A1 * | 12/2021 |

* cited by examiner

*Primary Examiner* — Mandish K Randhawa
(74) *Attorney, Agent, or Firm* — Edell, Shapiro & Finnan, LLC

(57) ABSTRACT

A method of configuring a user plane function node in, e.g., a fifth generation mobile core architecture to process user plane traffic without reliance on control messages over the Sx/N4 or Gx/N7 interfaces. The method includes detecting a type of user traffic at a user plane function node in, e.g., a fifth generation mobile core architecture, selecting, on the user plane function node and based on the type of user traffic, a rule to be applied to the user traffic, and activating the rule to be applied to the user traffic. The approach reduces or eliminates north-south control traffic in CUPS architecture or 5G mobile core architecture.

20 Claims, 6 Drawing Sheets

ENFORCING DIFFERENTIAL POLICIES ON USER TRAFFIC IN A 5G/EPC ENVIRONMENT WITH CONGESTION AVOIDANCE AND REAL TIME POLICY ENFORCEMENT

TECHNICAL FIELD

The present disclosure relates to processing data traffic in a fifth generation (5G)/evolved packet core (EPC) environment.

BACKGROUND

In a 5G/EPC network, a User Plane Function (UPF)/User Plane (UP) is responsible for handling or processing user plane traffic, i.e., packets, received via a radio access network (RAN), from, e.g., user equipment (UE). The UPF/UP is typically configured by a Session Management Function (SMF)/Control Plane (CP) with instructions received from a Policy Control Function (PCF)/Policy and Charging Rules Function (PCRF).

More specifically, policies that control an operator's use case on a 5G/EPC network are installed by the PCF/PCRF onto the SMF/CP over the N7/Gx interfaces, respectively. These policies are then propagated by the SMF/CP to the UPF/UP, over the N4/Sx interface, in the form of packet detection rules (PDRs) for policy enforcement on user traffic as the user traffic is processed by the UPF/UP.

Thus, for a subscriber (i.e., user) session being processed by the UPF/UP, there are typically multiple N4/Sx interface transactions that occur between the UPF/UP and the SMF/CP containing information regarding specific user traffic. This information is then translated to N7/Gx interface transactions that occur between the SMF/CP and the PCF/PCRF to inform the PCF/PCRF of a specific event, and the PCF/PCRF then, in turn, based on the traffic information received, triggers policies to be transmitted over the N7/Gx interface between the PCF/PCRF and SMF/CP, and subsequently over the N4/Sx interface between the SMF/CP and UPF/UP for applying appropriate treatment to the user's traffic. Thus, there can be an inordinate amount of "north-south" control traffic that is exchanged among control plane functional nodes in response to traffic being processed by a UPF/UP.

DESCRIPTION OF EXAMPLE EMBODIMENTS

Overview

Presented herein is a method of configuring a user plane function node in, e.g., a fifth generation mobile core or evolved packet core architecture to process user plane traffic without reliance on control messages over the Sx/N4 or Gx/N7 interfaces. In an embodiment, the method includes detecting a type of user traffic at a user plane function node in a fifth generation mobile core architecture, selecting, on the user plane function node and based on the type of user traffic, a rule to be applied to the user traffic, and activating the rule to be applied to the user traffic. The approach reduces or eliminates north-south control traffic in CUPS architecture or 5G mobile core architecture by eliminating message exchange over N4/N7 and Gx/Sx interfaces.

In another embodiment, a device is provided. The device includes an interface configured to enable network communications, a memory, and one or more processors coupled to the interface and the memory, and configured to: detect a type of user traffic at a user plane function node in, e.g., a fifth generation mobile core architecture, select, on the user plane function node and based on the type of user traffic, a rule to be applied to the user traffic, and activate the rule to be applied to the user traffic.

Example Embodiments

Figure 1:
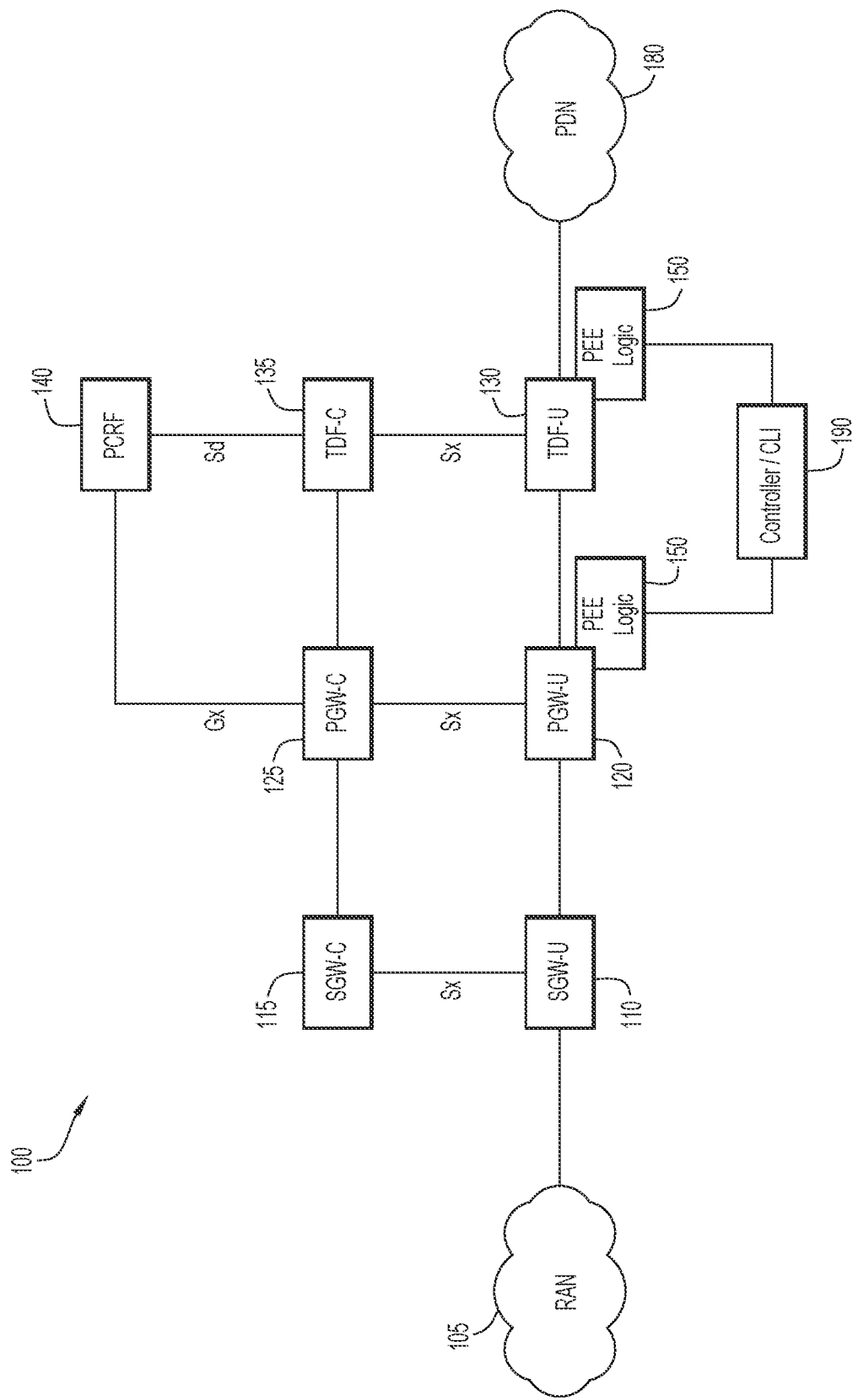
FIG. 1 shows a 5G control and user plane separation (CUPS) architecture including policy enforcement engine logic disposed with a traffic detection function (TDF) node, according to an example embodiment.
Figure 2:
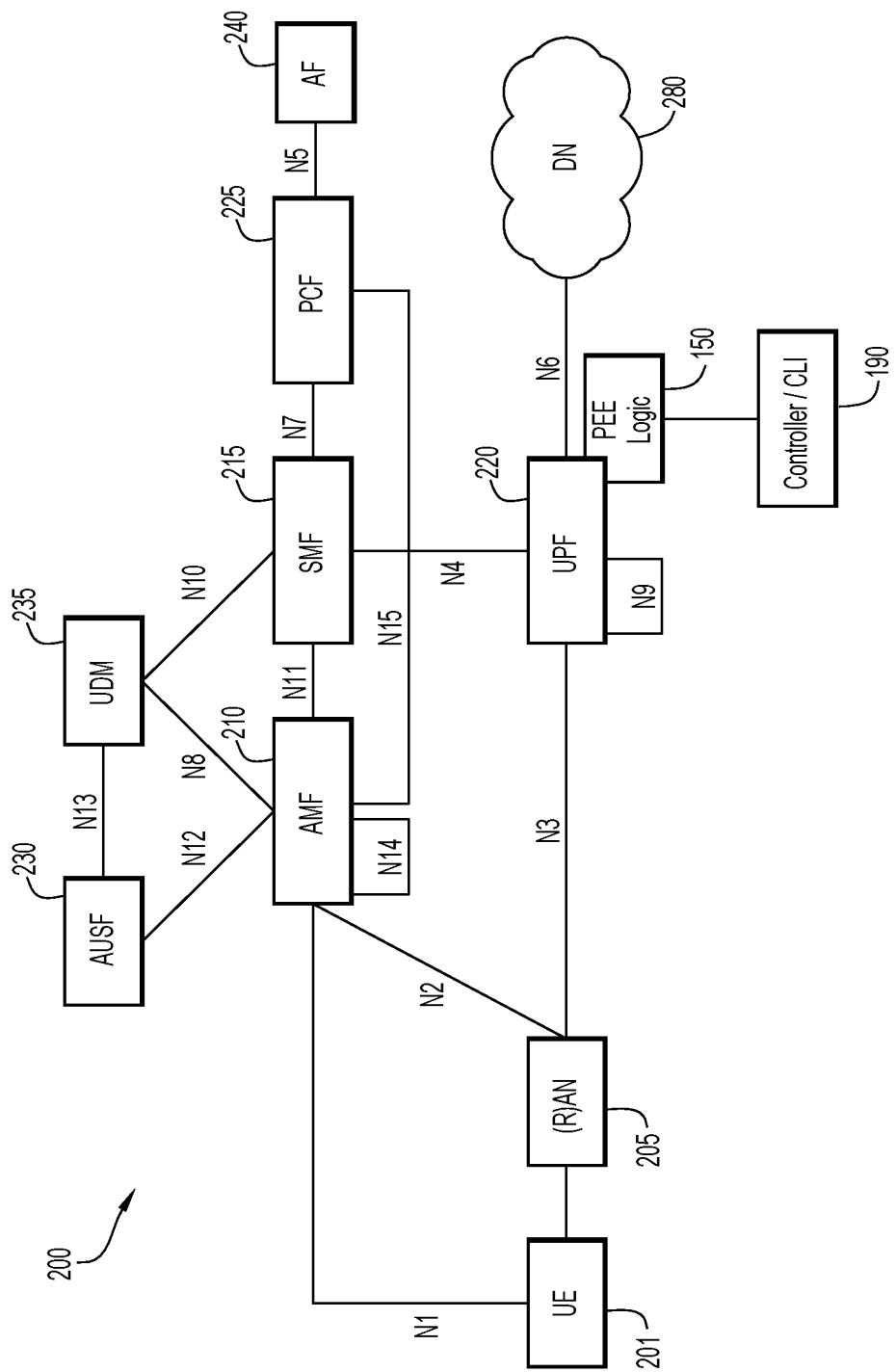
FIG. 2 shows a 5G mobile core architecture including policy enforcement engine logic disposed with a user plane function (UPF) node, according to an example embodiment.

FIG. 1 shows a 5G control and user plane separation (CUPS) architecture 100 including policy enforcement engine (PEE) logic 150 disposed with a traffic detection function (TDF) node, according to an example embodiment, and FIG. 2 shows a 5G mobile core architecture 200 including policy enforcement engine logic 150 disposed with a user plane function (UPF) node, according to an example embodiment. More specifically, architectures 100, 200 make up a mobile core network that may be configured as any combination of a (private or non-private) 4G/LTE core, typically referred to as the Evolved Packet Core or System (EPC/EPS), 5G core or system (5GC/5GS), nG core or system (e.g., a Sixth Generation (6G) core/system, etc.), and/or the like as may be defined by 3GPP or other similar standards and may include any components, network elements, etc. in order to facilitate operations discussed herein. For example, in FIG. 1, the architecture includes CUPS components including a user plane serving gateway SGW-U 110, a control plane serving gateway (SGW-C) 115, a user plane packet gateway (PGW-U) 120, a control plane packet gateway (PGW-C) 125, a user plane (UP) traffic detection function (TDF-U) 130, and a control plane traffic detection function (TDF-C) 135. As shown in FIG. 1, the control and user plane nodes communicate with one another via the Sx interface. A Policy and Charging Rules Function (PCRF) 140 is also provided and communicates over the Gx interface with PGW-C 125 and/or over the Sd interface with TDF-C 135. Those skilled in the art will appreciate that many other interfaces are defined for the depicted nodes as well as for other nodes. However, those interfaces are not particularly relevant to the embodiments described herein.

Also shown in FIG. 1 is a radio access network (RAN) 105 that enables a user equipment (UE) (not shown in FIG. 1) to communicate with the architecture 100. On the other end of FIG. 1, a packet data network (PDN) 180 serves content to the UE via the architecture 100 and RAN 105. Still also shown in FIG. 1, is policy enforcement engine (PEE) logic 150 that may be instantiated with TDF-U 130 or PGW-U 120 (i.e., in the user plane) and may be configured via a controller or command line interface (CLI) 190. The function of PEE logic 150 is discussed further below.

FIG. 2 shows one instance of a 5G/nG mobile core architecture 200 that includes multiple functional nodes as follows. An Access and Mobility Management function (AMF) 210 supports termination of network address translation (NAS) signaling, NAS ciphering & integrity protection, registration management, connection management, mobility management, access authentication and authorization, security context management.

A Session Management Function (SMF) 215 supports session management (e.g., session establishment, modification, release), UE IP address allocation & management, DHCP functions, termination of NAS signaling related to session management, DL data notification, and traffic steering configuration for UPF 220 for proper traffic routing.

A User Plane Function (UPF) 220 supports packet routing & forwarding, packet inspection, QoS handling, acts as external PDU session point of interconnect to Data Network (DN) 280, and is an anchor point for intra- & inter-radio access technology (RAT) mobility.

A Policy Control Function (PCF) 225 supports unified policy framework, and provides policy rules to control plane functions, and access subscription information for policy decisions in user data repository (UDR).

An Authentication Server Function (AUSF) 230 acts as an authentication server.

Unified Data Management (UDM) 235 supports generation of Authentication and Key Agreement (AKA) credentials, user identification handling, access authorization, subscription management.

An Application Function (AF) 240 supports application influence on traffic routing, and interaction with policy framework for policy control.

Still other nodes and functionality may also be provided.

As shown, a UE 201 may communicate over Radio Access Network (RAN) 205 and via mobile core architecture 200 to reach data network 280. Similar to the architecture 100 of FIG. 1, in FIG. 2, PEE logic 150 may be instantiated on UPF 220 (i.e., in the user plane), and may be controlled by controller or command line interface 190. FIG. 2 also shows the several interfaces between the several functional nodes depicted including interfaces N1, N2, N3, N4, N5, N6, N7, N8, N9, N10, N11, N12, N13, N14, and N15. Interfaces N4 and N7 (which correspond to interfaces Sx and Gx/Sd of architecture 100) are of particular interest in the context of the present embodiments.

As noted above, in order for data packets to be processed by PGW-U 120 or TDF-U 130 or UPF 220, packet data rules (PDRs) are first loaded or configured on the PGW-U 120 or TDF-U 130 or UPF 220, and those PDRs are received from, e.g., PCRF 140 and TDF-C 135 via the Gx/Sd and Sx interfaces, or PCF 225 and SMF 215 via the N4 and N7 interfaces. This PDR configuration process creates a significant amount of north-south control plane traffic.

To address the overuse of the Sx/Gx/Sd and N4/N7 interfaces, and in accordance with an embodiment, PEE logic 150 is configured, using controller of CLI 190, to self-install and uninstall the PDRs based on event identification on the TDF-U 130 or UPF 220, without any intervention from PCF 225/PCRF 140 or SMF 215/PGW-C 125/TDF-C 135. This eliminates or significantly reduces transactions on the Gx/Sd/N7 and the N4/Sx interfaces for processing related to PDRs.

Figure 3:
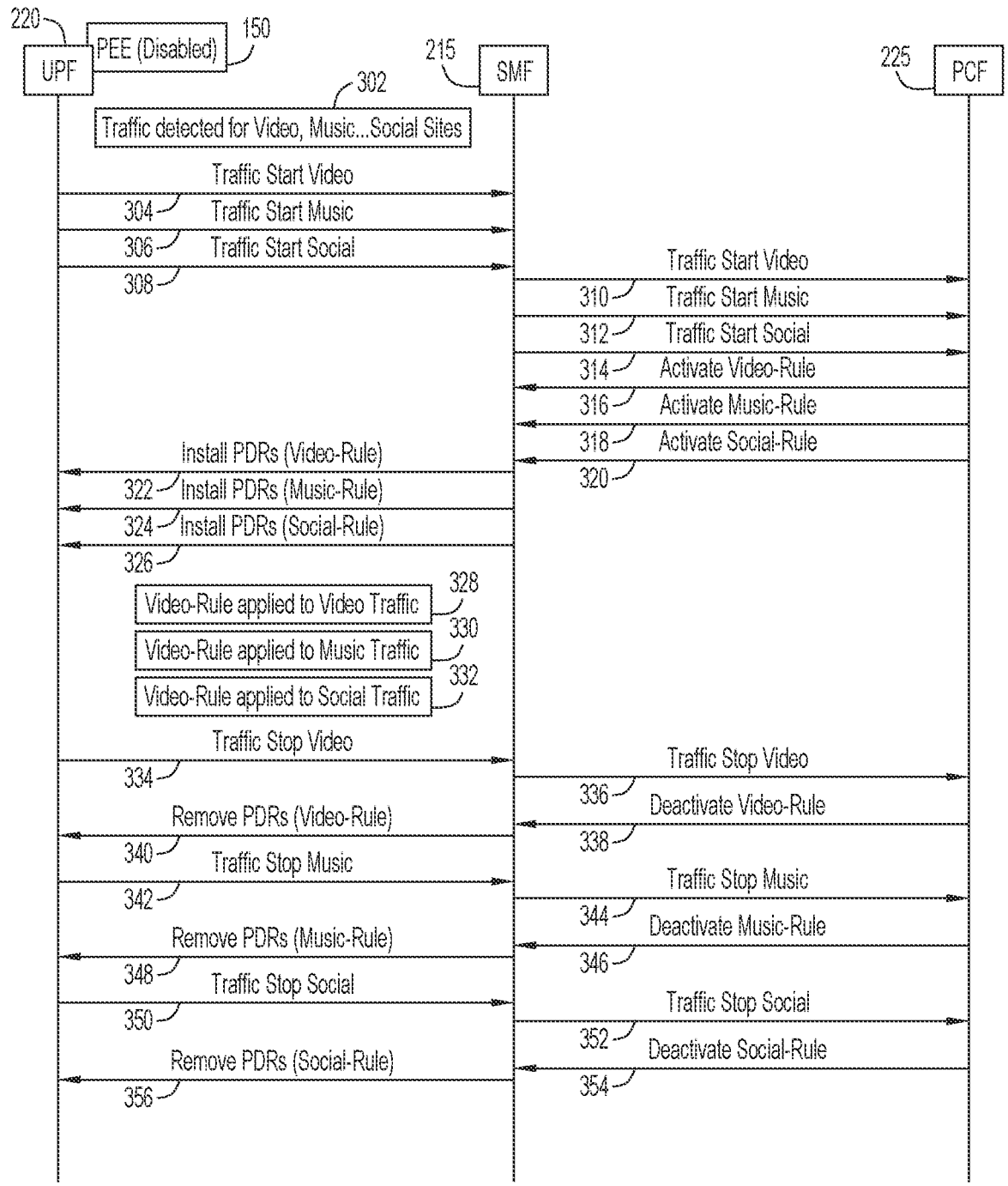
FIG. 3 shows a ladder diagram depicting relevant nodes in the 5G mobile core architecture where the policy enforcement engine logic is disabled, according to an example embodiment.

FIG. 3 shows a ladder diagram depicting relevant nodes, i.e., UPF 220, SMF 215, and PCF 225 in the 5G mobile core architecture 200 where the PEE logic 150 is disabled, according to an example embodiment. This functionality is juxtaposed to FIG. 4, which shows a ladder diagram depicting the same relevant nodes in the 5G mobile core architecture 200 where PEE logic 150 is enabled, according to an example embodiment. Referring first to FIG. 3, when PEE logic 150 is disabled, and in order to provide differential treatment to user traffic, UPF 220 informs SMF 215 of Start of Traffic with traffic type information. More specifically, at 302, UPF 220 detects video, music and social media traffic. At 304, UPF 220 sends a Traffic Start Video message to SMF 215. At 306, UPF 220 sends a Traffic Start Music message to SMF 215, and at 308, UPF 220 sends a Traffic Start Social message to SMF 215. These Start of Traffic messages are then passed over the N7/Gx interface to PCF 225 at 310, 312, and 314. PCF 225, depending on the policies configured for treating the received traffic type, will install such policies on the SMF 215 via Activate Video-Rule message at 316, Activate Music-Rule message at 318, and Activate Social-Rule at 320. These installed policies are then pushed to the UPF 220 in the form of Install PDRs (Video-Rule) at 322, Install PDRs (Music-Rule) at 324, and Install PDRs (Social-Rule) at 326.

In turn, UPF 220 processes the different traffic types with Video-Rule applied to Video Traffic at 328, Music-Rule applied to Music Traffic at 330, and Social-Rule applied to Social Traffic at 332.

At some point subsequent, when video traffic is no longer detected, UPF 220 sends a Traffic Stop Video message to SMF 215 at 334. That Traffic Stop Video message is sent to PCF 225 at 336, and PCF 225 sends a Deactivate Video-Rule to SMF 215 at 338. SMF 215 then sends a Remove PDRs (Video Rule) message to UPF 220 at 340.

Similarly, at some point subsequent, when music traffic is no longer detected, UPF 220 sends a Traffic Stop Music message to SMF 215 at 342. That Traffic Stop Music message is sent to PCF 225 at 344, and PCF 225 sends a Deactivate Music-Rule to SMF 215 at 346. SMF 215 then sends a Remove PDRs (Music Rule) message to UPF 220 at 348.

And, at still some other point subsequent, UPF 220, when social media traffic is no longer detected, sends a Traffic Stop Social message to SMF 215 at 350. That Traffic Stop Social message is sent to PCF 225 at 352, and PCF 225 sends a Deactivate Social-Rule to SMF 215 at 354. SMF 215 then sends a Remove PDRs (Social Rule) message to UPF 220 at 356.

Thus, when PEE logic 150 is disabled, there is significant messaging overhead and possibly congestion on the N4/N7 interfaces (and Sx/Gx/Sd interfaces in a CUPS implementation), possible latency in applying the policies on the detected traffic, as well as increased monetary cost for an operator since a per transaction cost may be incurred by the operator by the vendor of PCF 225 (or PCRF 140).

Figure 4:
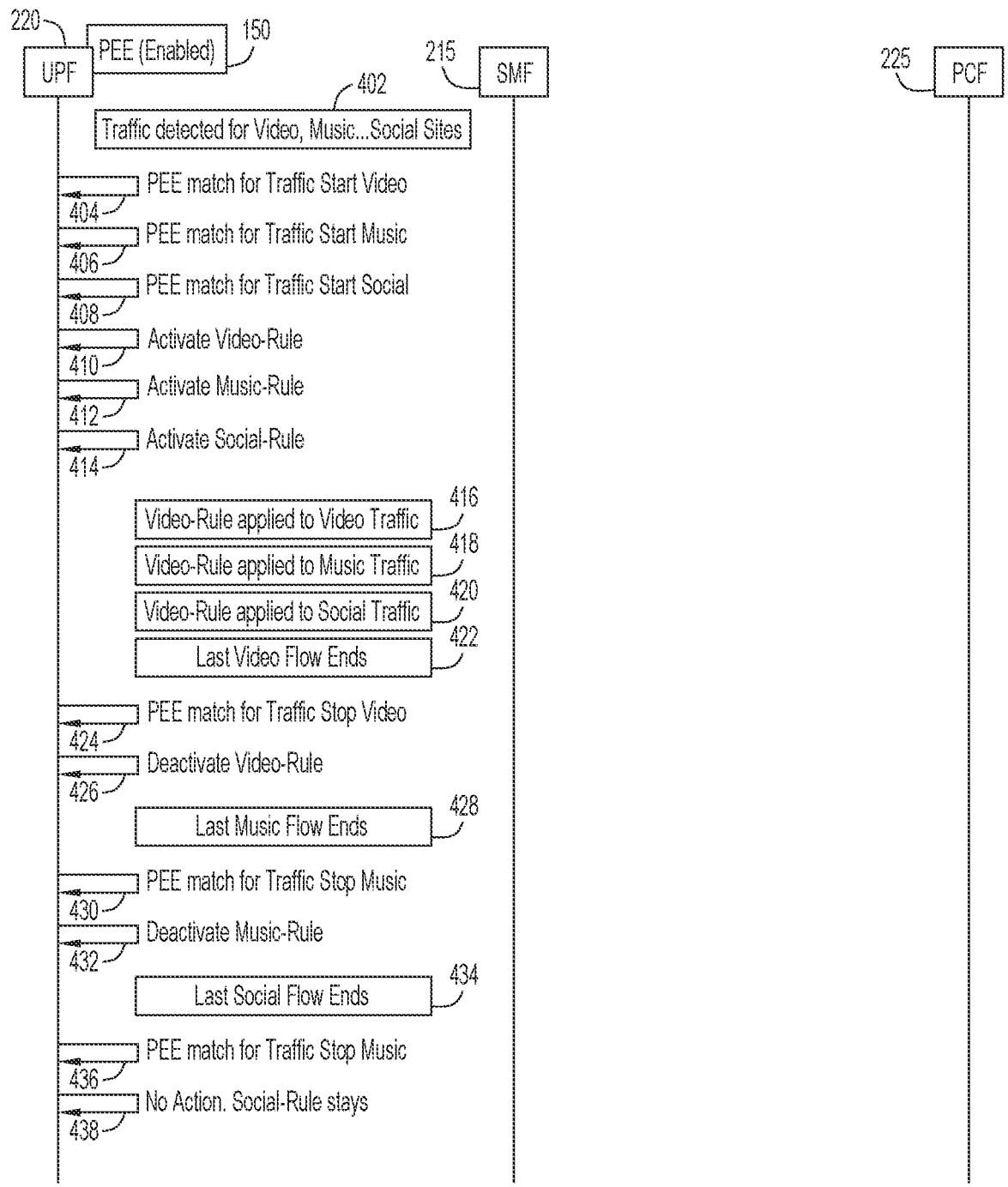
FIG. 4 shows a ladder diagram depicting relevant nodes in the 5G mobile core architecture where the policy enforcement engine logic is enabled, according to an example embodiment.

FIG. 4 shows functionality of an embodiment when PEE logic 150 is enabled. In an embodiment, PEE logic 150 is configured with rules (PDRs) directly from controller or CLI 190. In this manner, an operator directly controls the operation of the UPF 220 (or TDF-U 130) without intervention or communication with SMF 215 (or with PGW-C 125/TDF-C 135) via the N4/N7 interfaces (or via the and Sx/Gx/Sd interfaces). An operator can enable or disable PEE logic 150 as desired.

At 402, UPF 220 detects video, music or social media traffic. At 404, PEE logic 150 matches for Traffic Start Video. At 406, PEE logic 150 matches for Traffic Start Music. At 408, PEE 150 matches for Traffic Start Social. Instead of then communicating with SMF 215, PEE logic 150 is configured to activate the appropriate rule directly. That is, at 410, PEE logic 150 configures UPF 220 to Activate Video-Rule. At 412, PEE logic 150 configures UPF 220 to Activate Music-Rule. And, at 414, PEE logic 150 configures UPF 220 to Activate Social-Rule.

UPF 220 thereafter processes the different types of traffic with Video-Rule applied to Video Traffic at 416, Music-Rule applied to Music Traffic at 418, and Social-Rule applied to Social Traffic at 420.

At some point subsequent, when video traffic ends and is no longer detected, e.g., at 422, PEE logic 150 matches for Traffic Stop Video at 424, and at 426 causes UPF 220 to Deactivate Video-Rule.

Similarly, at some point subsequent, when music traffic ends and is no longer detected, e.g., at 428, PEE logic 150 matches for Traffic Stop Video at 430, and at 432 causes UPF 220 to Deactivate Music-Rule.

Likewise, at some point subsequent when social media traffic ends and is no longer detected, e.g., at 434, PEE logic 150 matches for Traffic Stop Social at 436, but at 438, instead of deactivating the social rule, PEE logic 150 is configured to take no action, and UPF 220 therefore maintains the Social-Rule. The operator in this particular case might have knowledge that social media traffic (or a flow) is likely to reappear and thus PEE logic 150 is programmed to not deactivate the rule(s) associated with processing social media on UPF 220.

Thus, as those skilled in the art will appreciate, the embodiments described herein support providing differential treatment to user traffic using policy enforcement engine logic 150 on UPF 220 or PGW-U 120 or TDF-U 130 (i.e., in the user plane). The policies that are enforced against specific traffic types are the same policies that could be received from PCF 225/SMF 215 or from PCRF 140/PGW-C 125/TDF-C 135. Once a certain traffic type is detected on UPF 220/PGW-C 125/TDF-U 130, PEE logic 150 selects a corresponding configured rule for the traffic type and activates that specific rule so that appropriate traffic treatment is performed. At any point in time, if UPF 220/PGW-U 120/TDF-U 130 detects that no more flows of a certain traffic type exist, PEE logic 150 is configured to selectively deactivate the activated rule. In the example of FIG. 4 and the table below, PEE logic 150 on UPF 220 can be configured to install a Video-Rule and a Music-Rule only as long as any Video or Music Traffic exists. On the other hand, for Social Media Traffic, PEE logic 150 may be configured to install Social-Rule upon Social Traffic detection and keep the rule alive throughout the lifetime of a user session, even if the Social traffic or flow itself has ended.

TABLE 1

Rule Activation

| Trigger | Condition | Action |
| --- | --- | --- |
| Video Traffic Starts | Video Flows > 1 | Activate Video-Rule |
| Video Traffic Ends | Video Flows = 0 | Deactivate Video-Rule |
| Music Traffic Starts | Music Flows > 1 | Activate Music-Rule |
| Music Traffic Ends | Music Flows = 0 | Deactivate Music-Rule |
| Social Traffic Starts | Social Flows > 1 | Activate Social-Rule |
| Social Traffic Ends | Social Flows = 0 | No Action |

The condition variable could be extended to support various other parameters like Time of Day, Radio Access Technology (RAT) type, etc.

Figure 5:
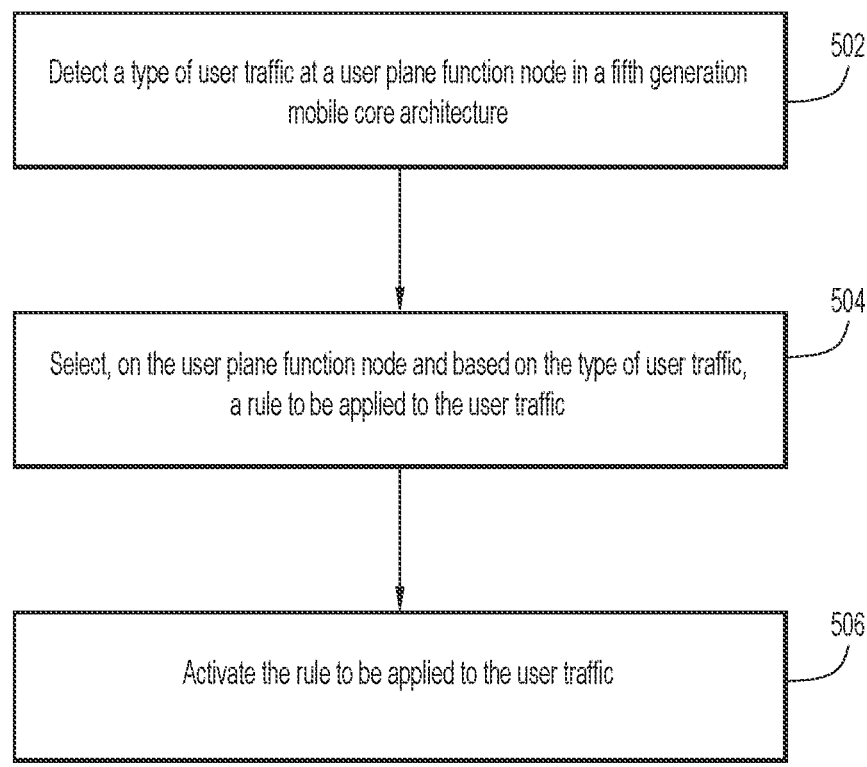
FIG. 5 is a flowchart showing a series of operations performed by the policy enforcement engine logic and UPF, according to an example embodiment.

FIG. 5 is a flowchart showing a series of operations performed by the policy enforcement engine logic 150, according to an example embodiment. Those skilled in the art will appreciate that the depicted operations may be performed on a UPF, PGW-U, or a TDF-U. That is, PEE logic 150 may be installed on a user plane node. At 502, an operation detects a type of user traffic at a user plane function node in a fifth generation mobile core architecture. At 504, an operation selects, on the user plane function node and based on the type of user traffic, a rule to be applied to the user traffic. And, at 506, an operation activates the rule to be applied to the user traffic.

Figure 6:
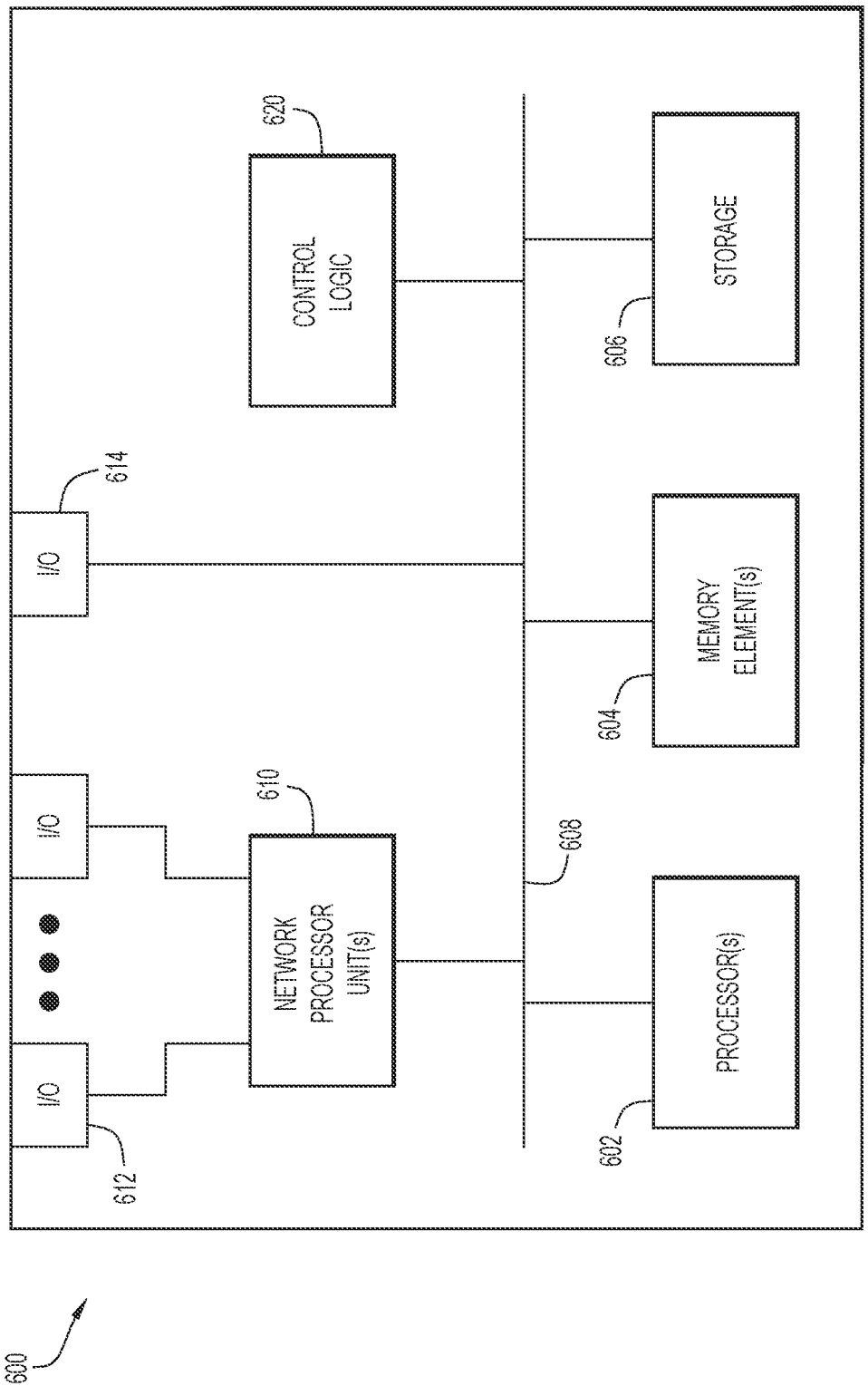
FIG. 6 illustrates a hardware block diagram of a computing device that may be configured to execute policy enforcement engine logic, according to an example embodiment.

FIG. 6 illustrates a hardware block diagram of a computing device that may be configured to execute policy enforcement engine logic 150, according to an example embodiment.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., policy enforcement engine logic 150) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., policy enforcement engine logic 150) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, method is provided and includes detecting a type of user traffic at a user plane function node in, e.g., a fifth generation mobile core architecture, selecting, on the user plane function node and based on the type of user traffic, a rule to be applied to the user traffic, and activating the rule to be applied to the user traffic.

In the method, the user plane function node is at least one of a traffic detection function in a control plane and user plane separation (CUPS) architecture or a user plane function (UPF) in a 5G mobile core architecture.

The type of user traffic may be at least one of video traffic, music traffic, or social media traffic.

The method may further include configuring the user plane function node with the rule to be applied to the user traffic, wherein the configuring does not use a Sx interface of a control plane and user plane separation (CUPS) architecture or a N4 interface of a 5G mobile core architecture. The configuring may be performed with a controller, via a command line interface (CLI).

The method may further include configuring the user plane function node with the rule to be applied to the user traffic, wherein the configuring does not use a Gx/Sd interface of a control plane and user plane separation (CUPS) architecture or a N7 interface of a 5G mobile core architecture. The rule to be applied to the user traffic may implement a differential policy for the type of user traffic.

The method may still further include deactivating the rule to be applied to the user traffic upon detecting that the type of user traffic has ended.

And, the method may also include maintaining the rule to be applied to the user traffic upon detecting that the type of user traffic has ended.

In another embodiment, a device is provided. The device includes an interface configured to enable network communications, a memory, and one or more processors coupled to the interface unit and the memory, and configured to: detect a type of user traffic at a user plane function node in, e.g., a fifth generation mobile core architecture, select, on the user plane function node and based on the type of user traffic, a rule to be applied to the user traffic, and activate the rule to be applied to the user traffic.

The user plane function node may be at least one of a traffic detection function in a control plane and user plane separation (CUPS) architecture or a user plane function (UPF) in a 5G mobile core architecture.

The type of user traffic may be at least one of video traffic, music traffic, or social media traffic.

In an embodiment, the one or more processors may be configured to configure the user plane function node with the rule to be applied to the user traffic, without using a Sx interface of a control plane and user plane separation (CUPS) architecture or a N4 interface of a 5G mobile core architecture.

In another embodiment, the one or more processors may be configured to configure the user plane function node with the rule to be applied to the user traffic, without using a Gx/Sd interface of a control plane and user plane separation (CUPS) architecture or a N7 interface of a 5G mobile core architecture.

In still another embodiment, a non-transitory computer readable storage media encoded with instructions is provided. When executed by a processor, the instructions cause the processor to: detect a type of user traffic at a user plane function node in, e.g., a fifth generation mobile core architecture, select, on the user plane function node and based on the type of user traffic, a rule to be applied to the user traffic, and activate the rule to be applied to the user traffic.

The user plane function node may be at least one of a traffic detection function in a control plane and user plane separation (CUPS) architecture or a user plane function (UPF) in a 5G mobile core architecture.

The type of user traffic may be at least one of video traffic, music traffic, or social media traffic.

The instructions, when executed by the processor, may cause the processor to configure the user plane function node with the rule to be applied to the user traffic, without using a Sx interface of a control plane and user plane separation (CUPS) architecture or a N4 interface of a 5G mobile core architecture.

The instructions, when executed by the processor, may cause the processor to configure the user plane function node with the rule to be applied to the user traffic, without using a Gx/Sd interface of a control plane and user plane separation (CUPS) architecture or a N7 interface of a 5G mobile core architecture.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    configuring a user plane function node in a mobile core architecture with a rule to be applied to a type of user traffic;
    detecting the type of user traffic at the user plane function node;
    selecting, on the user plane function node and based on the type of user traffic, the rule to be applied to the type of user traffic; and
    after the detecting, activating the rule to be applied to the type of user traffic,
    wherein the configuring and the activating are performed without using a Sx interface of a control plane and user plane separation (CUPS) architecture or a N4 interface of a 5G mobile core architecture and without intervention from a Policy Control Function (PCF), a Policy and Charging Rules Function (PCRF), a Session Management Function (SMF), a Packet Gateway control plane (PGW-C), or a control plane Traffic Detection Function (TDF-C) of the mobile core architecture.

2. The method of claim 1, wherein the user plane function node is at least one of a traffic detection function in a control plane and user plane separation (CUPS) architecture or a user plane function (UPF) in a 5G mobile core architecture.

3. The method of claim 1, wherein the type of user traffic is at least one of video traffic, music traffic, or social media traffic.

4. The method of claim 1, wherein the configuring is performed with a controller.

5. The method of claim 4, further comprising operating the controller via a command line interface (CLI).

6. The method of claim 1, further comprising configuring the user plane function node with the rule to be applied to the user traffic, wherein the configuring does not use a Gx/Sd interface of a control plane and user plane separation (CUPS) architecture or a N7 interface of a 5G mobile core architecture.

7. The method of claim 1, wherein the rule to be applied to the user traffic implements a differential policy for the type of user traffic.

8. The method of claim 1, further comprising deactivating the rule to be applied to the user traffic upon detecting that the type of user traffic has ended, without using the Sx interface or the N4 interface.

9. The method of claim 1, further comprising maintaining the rule to be applied to the user traffic upon detecting that the type of user traffic has ended.

10. A device comprising:
    an interface configured to enable network communications;
    a memory; and
    one or more processors coupled to the interface and the memory, and configured to:
    configure a user plane function node in a mobile core architecture with a rule to be applied to a type of user traffic;

detect the type of user traffic at the user plane function node in a mobile core architecture;
select, on the user plane function node and based on the type of user traffic, the rule to be applied to the type of user traffic; and
after detecting the type of user traffic, activate the rule to be applied to the type of user traffic,
wherein the one or more processors are configured to configure and activate the rule to be applied to the type of user traffic without using a Sx interface of a control plane and user plane separation (CUPS) architecture or a N4 interface of a 5G mobile core architecture and without intervention from a Policy Control Function (PCF), a Policy and Charging Rules Function (PCRF), a Session Management Function (SMF), a Packet Gateway control plane (PGW-C), or a control plane Traffic Detection Function (TDF-C) of the mobile core architecture.

11. The device of claim 10, wherein the user plane function node is at least one of a traffic detection function in a control plane and user plane separation (CUPS) architecture or a user plane function (UPF) in a 5G mobile core architecture.

12. The device of claim 10, wherein the type of user traffic is at least one of video traffic, music traffic, or social media traffic.

13. The device of claim 10, wherein the one or more processors are configured to configure the user plane function node with the rule to be applied to the user traffic, without using a Gx/Sd interface of a control plane and user plane separation (CUPS) architecture or a N7 interface of a 5G mobile core architecture.

14. The device of claim 10, wherein the one or more processors are configured to deactivate the rule to be applied to the user traffic upon detecting that the type of user traffic has ended, without using the Sx interface or the N4 interface.

15. The device of claim 10, wherein the one or more processors are configured to maintain the rule to be applied to the user traffic upon detecting that the type of user traffic has ended.

16. A non-transitory computer readable storage media encoded with instructions that, when executed by a processor, cause the processor to:
configure a user plane function node in a mobile core architecture with a rule to be applied to a type of user traffic;
detect the type of user traffic at the user plane function node in a mobile core architecture;
select, on the user plane function node and based on the type of user traffic, the rule to be applied to the type of user traffic; and
after detecting the type of user traffic, activate the rule to be applied to the type of user traffic,
wherein the processor is configured to configure and activate the rule to be applied to the type of user traffic without using a Sx interface of a control plane and user plane separation (CUPS) architecture or a N4 interface of a 5G mobile core architecture and without intervention from a Policy Control Function (PCF), a Policy and Charging Rules Function (PCRF), a Session Management Function (SMF), a Packet Gateway control plane (PGW-C), or a control plane Traffic Detection Function (TDF-C) of the mobile core architecture.

17. The non-transitory computer readable storage media of claim 16, wherein the user plane function node is at least one of a traffic detection function in a control plane and user plane separation (CUPS) architecture or a user plane function (UPF) in a 5G mobile core architecture.

18. The non-transitory computer readable storage media of claim 16, wherein the type of user traffic is at least one of video traffic, music traffic, or social media traffic.

19. The non-transitory computer readable storage media of claim 16, wherein instructions, when executed by the processor, cause the processor to configure the user plane function node with the rule to be applied to the user traffic, without using a Gx/Sd interface of a control plane and user plane separation (CUPS) architecture or a N7 interface of a 5G mobile core architecture.

20. The non-transitory computer readable storage media of claim 16, wherein the instructions, when executed by the processor, cause the processor to deactivate the rule to be applied to the user traffic upon detecting that the type of user traffic has ended, without using the Sx interface or the N4 interface.

* * * * *